United States Patent
Nandanuru et al.

(10) Patent No.: US 9,971,581 B1
(45) Date of Patent: May 15, 2018

(54) PROGRAMMING LANGUAGE CONVERSION (71) Applicant: Wells Fargo Bank, N.A., Charlotte, NC (US)

(72) Inventors: Prasanth Nandanuru, Seriligampally (IN); Priyanka Amara, Hyderabad (IN); Shiju Thukalankuzhy John, Hyderabad (IN); Andrew J. Garner, IV, State Road, NC (US); Kory Bunya, Foster City, CA (US); Eduardo Dela Torre, Oakland, CA (US); Dennis Montenegro, Concord, GA (US); Yevanna M. Yejjala, East Godavari Dist. (IN); Dinakar Channakal Krishnappa, Yelahanka (IN); Chinababu Kona, West Godavari (IN); Sai Krishna Verma Sundaragiri, Warangal (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 111 days.

(21) Appl. No.: 15/015,797

(22) Filed: Feb. 4, 2016

Related U.S. Application Data (60) Provisional application No. 62/271,796, filed on Dec. 28, 2015.

(51) Int. Cl.
*G06F 9/45* (2006.01)

(52) U.S. Cl.
CPC . *G06F 8/51* (2013.01); *G06F 8/52* (2013.01)

(58) Field of Classification Search
CPC .................................... G06F 8/51; G06F 8/52
USPC ................................................ 717/136, 137
See application file for complete search history.

(56) References Cited

U.S. PATENT DOCUMENTS

| | | | |
|---|---|---|---|
| 6,061,513 A | 5/2000 | Scandura | |
| 6,453,464 B1 | 9/2002 | Sullivan | |
| 6,523,171 B1 | 2/2003 | Dupuy et al. | |
| 6,698,014 B1 | 2/2004 | Rechter | |
| 8,819,621 B2 | 8/2014 | Naik et al. | |
| 9,298,871 B1* | 3/2016 | Fallon | G06F 17/5072 |
| 2006/0005172 A1 | 1/2006 | Fuchs | |
| 2006/0009962 A1* | 1/2006 | Monk | G06F 17/2264 704/4 |
| 2007/0038985 A1* | 2/2007 | Meijer | G06F 8/51 717/137 |

(Continued)

OTHER PUBLICATIONS

Dony George, et al., Programming Language Inter-conversion, International Journal of Computer Applications, 2010, 68-74, 1.

*Primary Examiner* — Phillip H Nguyen
(74) *Attorney, Agent, or Firm* — Walter | Haverfield LLP; James J. Pingor (57) ABSTRACT

Systems and methods for converting an application to new programming language or framework is provided. A source application written in a legacy framework is analyzed and divided into smaller segments of code. The smaller segments are evaluated for quality in view of best practices design for writing applications. A rubric is determined for each segment and compared to a best practice threshold. Segments can be evaluated for features that can be passed through a model. The model converts the features into code in the new programming language. Machine learning and rules databases are updated with details of the conversion.

15 Claims, 6 Drawing Sheets

(56) References Cited

U.S. PATENT DOCUMENTS

| | | | |
|---|---|---|---|
| 2007/0168984 A1* | 7/2007 | Heishi | G06F 8/443 717/124 |
| 2013/0239098 A1 | 9/2013 | Ichii et al. | |
| 2015/0082290 A1* | 3/2015 | Peled | G06F 8/76 717/137 |
| 2015/0234642 A1* | 8/2015 | Araya | G06F 3/04842 717/137 |
| 2016/0350204 A1* | 12/2016 | Conlon | G06F 11/3612 |

* cited by examiner

PROGRAMMING LANGUAGE CONVERSION

CROSS-REFERENCE TO RELATED APPLICATIONS

This application claims the benefit of U.S. Provisional Application Ser. No. 62/271,796, filed Dec. 28, 2015, and entitled "SELF DRIVEN CODE MINER," the entirety of which is expressly incorporated herein by reference.

BACKGROUND

Applications run on programming code to perform functions of the application. The programming code is run on one language or framework that has a unique structure for running tasks and perform functions. There are multiple programming frameworks that provide differing structures to provide the same or similar functions. Issues arise when programming frameworks become outdated or inferior. It is increasingly time consuming to migrate applications from one programming language or framework to different or updated language.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of for converting an application to new programming language or framework is provided. A source application written in a legacy framework is analyzed and divided into smaller segments of code. The smaller segments are evaluated for quality in view of best practices design for writing applications. A rubric is determined for each segment and compared to a best practice threshold. Segments can be evaluated for features that can be passed through a model. The model converts the features into code in the new programming language. Machine learning and rules databases are updated with details of the conversion.

In aspects, the subject innovation provides substantial benefits in terms of automated code migration and automated code refactoring. These and other benefits of the innovation will be better understood upon a review of the detailed description infra.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers or special-purpose machines.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
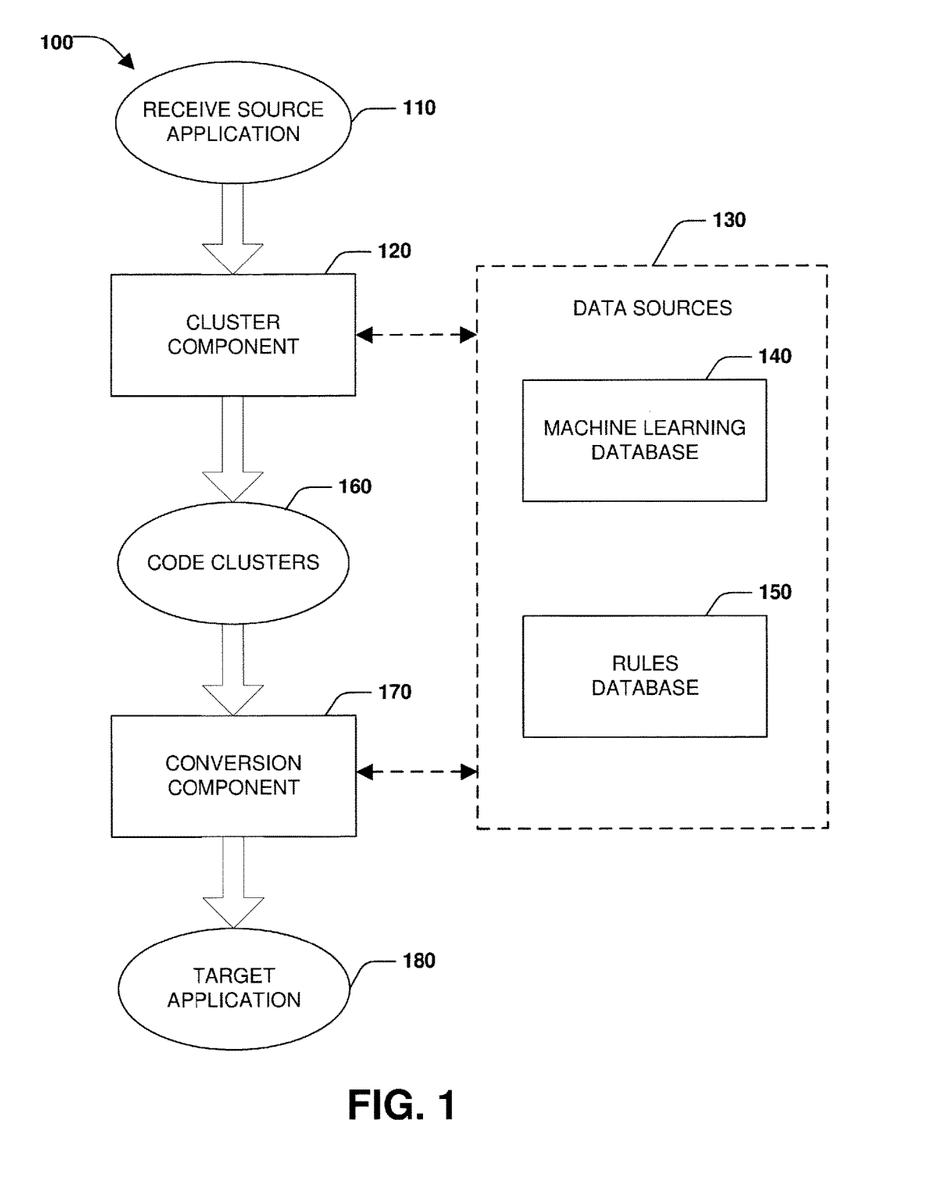
FIG. 1 illustrates an example input/output diagram for converting an application.

With reference to FIG. 1, an example input/output diagram 100 for converting an application is depicted. A first source application 110 is received by a cluster component 120. The source application 110 is an application that performs functions using programming code. The programming code is written using a first programming language or framework. Programming language can be a programming framework, development environment, or the like. For example, a source application code can use a end-of-life web development framework such as the Apache Struts (hereinafter "Struts") code framework. An end-of-life application can be converted to an active framework to facilitate updates and newer and/or beneficial features.

The cluster component 120 receives the source application 110 to be converted. The cluster component 120 divides the source application 110 into smaller modules or clusters. The division splits the code into logical clusters. For example, clusters can be arranged according to function. As another example, each cluster includes the same software elements for each function so as model-view-controller.

The cluster component 120 accesses data sources 130. The data sources 130 include databases to facilitate clustering and conversion. The data sources 130 include a machine learning database 140. The machine learning database 140 is initialized with a set of default machine learning techniques for analyzing code and recognizing features and clusters. The machine learning database 140 self intelligently learns and aligns itself to the complexity and/or nature of the source application. The machine learning is based on the number and variety of applications that are converted through the tool and can be integrated as part of an application life cycle management process.

The data sources 130 include a rules database 150. The rules database 150 includes rules for organizing the clusters. For example, the rules database 150 can includes a rule for the number of interfaces in a cluster. The cluster component 120 optimizes the rules in the rules database 150 with the machine learning over iterations and conversions without human intervention.

The cluster component 120 forms the code clusters 160 to be converted. A conversion component 170 receives the code clusters 160 from the cluster component 120. The conversion component 170 converts the source application 110 into a target application 180. The conversion component 170 evaluates each cluster according to the machine learning database 140 and the rules database 150. The conversion component 170 evaluates the code of the code cluster for software modules according to best design practices in the machine learning database 140 and the rules database 150. Rules can be thresholds for fan in/fan out, depth, data access or the like. The conversion component 170 converts the source application cluster by cluster into the target application such that the target application follows best design practices and updated coding methodologies. In one embodiment, the conversion component 170 can build a model by analyzing corresponding clusters in a source application and a target application. The model is built by learning a mapping of known parts in source application cluster and the corresponding converted cluster in the target application. The model is updated with knowledge of the associated clusters and creates a rule to facilitate future conversions. The conversion component 170 is discussed in further detail below.

Figure 2:
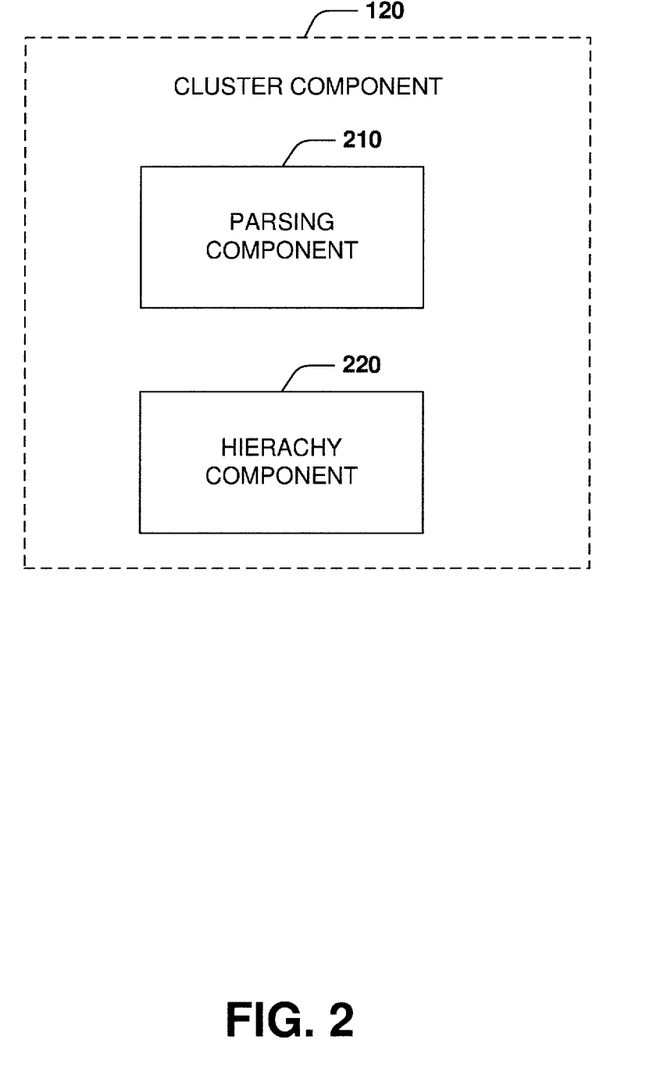
FIG. 2 illustrates an example component diagram of a cluster component.

With reference to FIG. 2, and continuing reference to FIG. 1, a component diagram of the cluster component 120 is depicted. The cluster component 120 includes a parsing component 210. The parsing component 210 analyzes the source application on a line by line or word by word basis. The parsing component 210 can recognize segments or code fragments for function or the like. The parsing component 210 applies a k-mean clustering machine learning technique to divide the given software application's code into coarse grained logical clusters. In one embodiment, the k-mean clustering can iteratively and incrementally with each cluster containing set of identical software modules delineated by model-view-controller layers.

The cluster component 120 includes a hierarchy component 220. The hierarchy component 220 receives the coarse grain clusters from the parsing component 210. The hierarchy component 220 further divides each coarse grain cluster into fine grained micro-clusters. The hierarchy component 220 applies an hierarchical-divisive clustering method on each coarse grain cluster. The hierarchical-divisive clustering method can be in a continuous and iterative manner to split the coarse grain clusters into fine grained micro-clusters. The micro-clusters are delineated by type and nature of software modules. In one embodiment, the cluster component 120 applies a decision tree machine learning technique for classification and bucketing of software modules within each micro-cluster.

Figure 3:
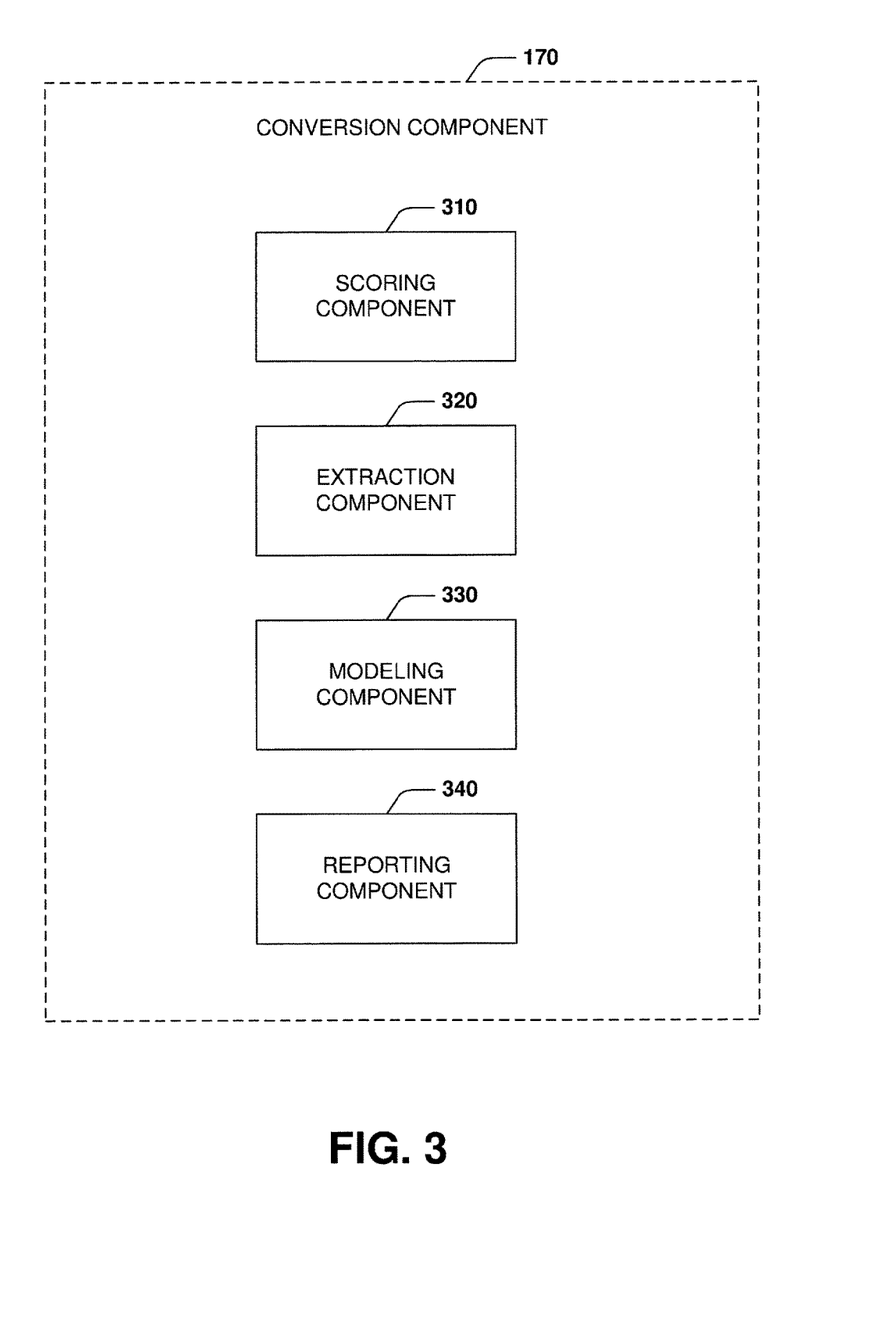
FIG. 3 illustrates an example component diagram of a conversion component.

With reference to FIG. 3, and continuing reference to FIG. 1, the example conversion component 170 includes a scoring component 310. The scoring component 170 evaluates each cluster to determine ease of automated conversion. The scoring component 310 determines a conversion score reflecting the sensitivity versus specificity of each cluster. The sensitivity is a reflection of the objectivity, e.g. generality, of the code for conversion. The specificity is a reflection of the relevance of the code for conversion. In one embodiment, the score is the sensitivity divided by the specificity, such that the higher the score, the easier conversion should be. The score can be determined according to the rules database 150 which includes best design practice rules that can be machine learned over time or at a default state. The score can be a weighted average of rules scores. For example, the rules database 150 can include a maximum number of interfaces in the source application and/or cluster that a good candidate cluster should not exceed.

The conversion component 170 includes an extraction component 320. The extraction component 320 extracts features from the clusters. The extraction component 320 constructs an M*N two-dimensional matrix by introspecting M number of modules in each cluster and identifying the N number of features associated with each module. The features to identify in the modules in the cluster are configured in machine learning database 140. The features can include code semantics, modularity, layering, strong cohesion, loose coupling, and/or design time class relationships. The design time class relationships can include association, aggregation, dependency, generalization, and/or realization.

From the extracted features, the scoring component 310 determines the conversion score of each cluster. In one embodiment, the scoring component 310 determines the conversion score on a module basis or a features basis for granularity.

The conversion score of each cluster is compared to a threshold score. If the conversion score meets the threshold score, the cluster is a good candidate for automated conversion. If the conversion score does not meet the threshold score, the cluster is excluded from automated conversion. The failing cluster can be flagged for modeling or to be converted manually.

The conversion component 170 converts clusters meeting the threshold score. The conversion component 170 can map the clusters recognized in the first programming language to the new programming language. In a specific exemplary case of migrating a Struts application to a Spring application, Struts is an end-of-life web development framework and Spring is an active web development framework. Struts classes have corresponding mapped classes in Spring. A Struts specific tag can be converted to a corresponding simple HTML tag in Spring. Form beans in Struts can be converted to Command Classes in Spring. Action Classes can be converted to Controller Classes. Struts specific configuration files can be converted into a mapping table class that will be used as lookup table in converted Spring controller classes. ActionForward Classes will be converted into equivalent Spring ModelAndView classes.

The conversion component 170 includes a modeling component 330. The scoring component 310 passes the clusters not meeting the threshold score to the modeling component 330. The modeling component 310 models each feature identified in the low scoring cluster. Modules in the cluster are converted for refactoring by applying the best model derived from several iterations on linear regression machine learning in the machine learning database 140. The linear regression model is a self-learning/self-healing model that predicts the best design pattern and refactor logic to be applied on a module or group of related modules based on several parameters. The parameters can include type of module (model, view, and controller), type of application (web, mobile, client/server and database), application stack, version, language support for object orientation and test driven methodologies.

The conversion component 170 compiles converted clusters and modeled features and outputs a compiled target application that runs on different programming language and/or framework. The target application functions like the source application to an outside user but runs on different code, language, and/or framework than the source application.

A user can review the outputted target application via the conversion component 170. The user can debug the converted code of the target application to verify the automated converted code operates as intended. In the Struts to Spring example conversion, ActionErrors and ActionMessages are typical of not meeting the threshold and difficult to model. ActionErrors, custom tags built on Struts, and/or customized framework modules can be addressed manually for conversion. They can be mapped as framework independent plain old java objects (POJO's) in converted Spring code. JSP custom taglibs can be utilized in Spring to display the validation errors/messages.

The conversion component 170 includes a reporting component 340. The reporting component 340 generates a report on the conversion of the code including conversion scores. The reporting component 340 updates the machine learning database 140 and rules database 340 with the conversion scores and updated models. The reporting component 340 sends the generated report to a user for review.

Figure 4:
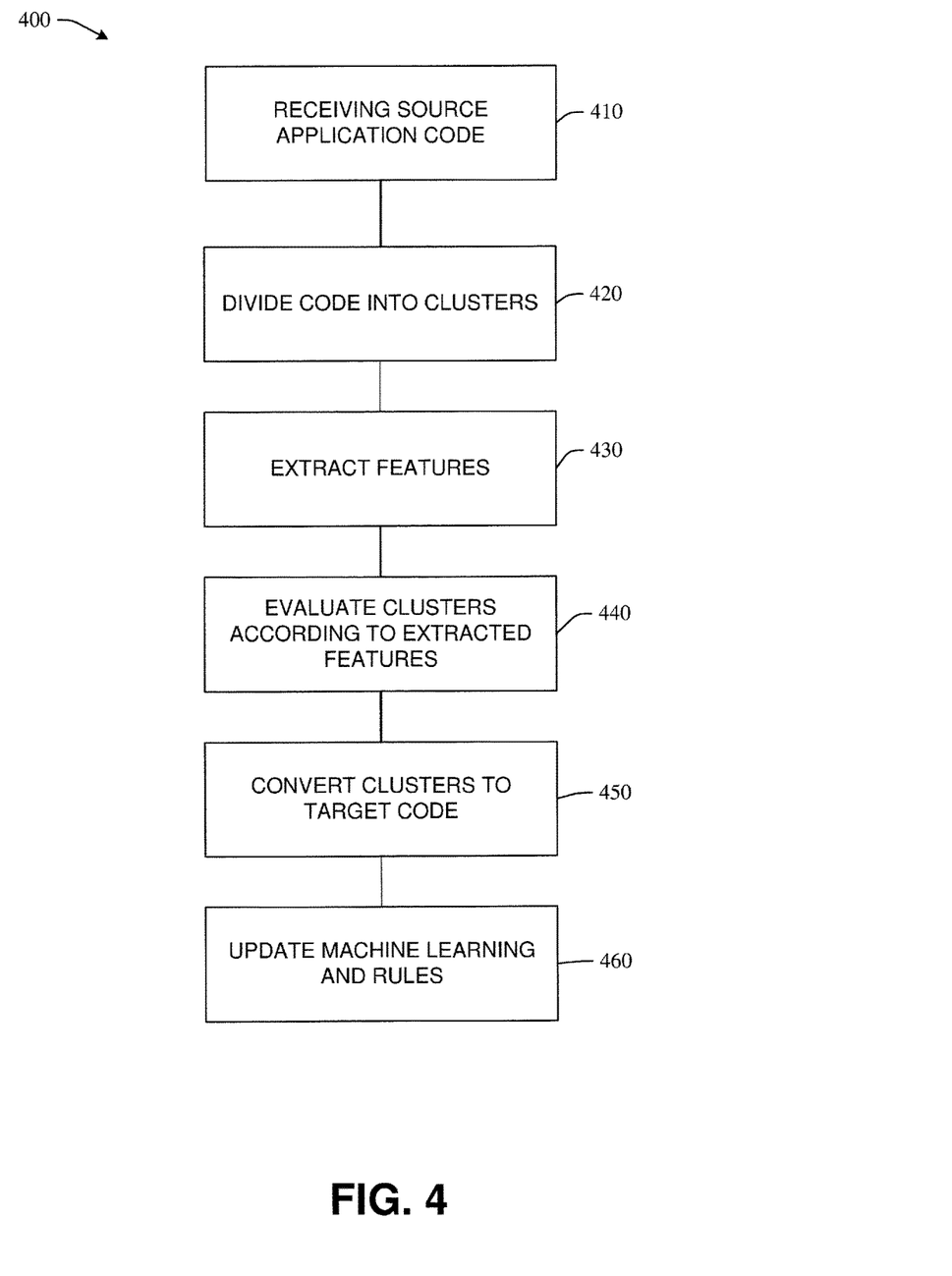
FIG. 4 illustrates a flowchart for converting an application.

With reference to FIG. 4, an example method 400 is depicted for authenticating a customer of a financial institution. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

In aspects, method 400 can begin at 410 by receiving source application code. The source application code is written in a first or legacy programming framework. For example, a source application can be a web application written using the Struts development framework. At 420, the source application code is divided into clusters. The source application code is parsed for code clusters. A clustering algorithm is used such as k-means clustering, hierarchical clustering, and the like and/or a combination thereof. Continuing the example, the web application can be divided into model-view-controller layers representing the software architectural pattern. The model-view-controller layers make up the cluster with each cluster having the same modules. The cluster can be further divided into micro-clusters. The micro clusters are separated by type and nature of the code in the cluster.

At 430, features of the cluster are extracted. The features can be statistics or analytical details about the code. The features determine qualities of the code for evaluating the clusters. In the example, a cluster can have strong cohesion and loose coupling as features. At 440, the clusters are evaluated for extracted features. The evaluation can result in a score representing quality of the source code of the cluster, which determines ease of automated conversion. Programming rules can dictate quality in a machine learning database. In the example, a programming rule for best design practices can be a maximum number of interfaces.

At 450, the clusters are converted into a second or new programming framework. The clusters that receive a good score can be converted with less effort. The conversion can map the source code to target code in a different language. For example, converting a Struts application into a Spring application can include mapping Struts xml forms to Spring JSP forms. Below is a specific example mapping table for Struts to Spring mapping. It is appreciated that mapping tables for many different source and target application frameworks are also contemplated.

| STRUTS | SPRING |
| --- | --- |
| <html:html> | <html> |
| <html:form> | <form: form> |
| <html:error> | <form: errors> |
| <html:text property="abc"> | <form: input path="abc"> |
| <html:select property="abc"> | <form: select path="abc"> |
| <option value="one"> | <option value="one"> |
| <html:submit> | <input type="submit"> |
| <bean:message bundle="resource" key="abc"> | <spring: message code="abc"> |
| <html:checkbox property="abc"> | <form:checkbox path="abc"> |

At 460, machine learning and rules databases are updated. The machine learning and rules databases are updated with details of the conversion for future conversions. For example, the corresponding clusters in the source application and the target application can be used to create conversion rules and/or a model for future conversions. In one embodiment, the machine learning and rules databases can be updated with new rules appropriated by changes and/or updates to a target or source framework.

Figure 5:
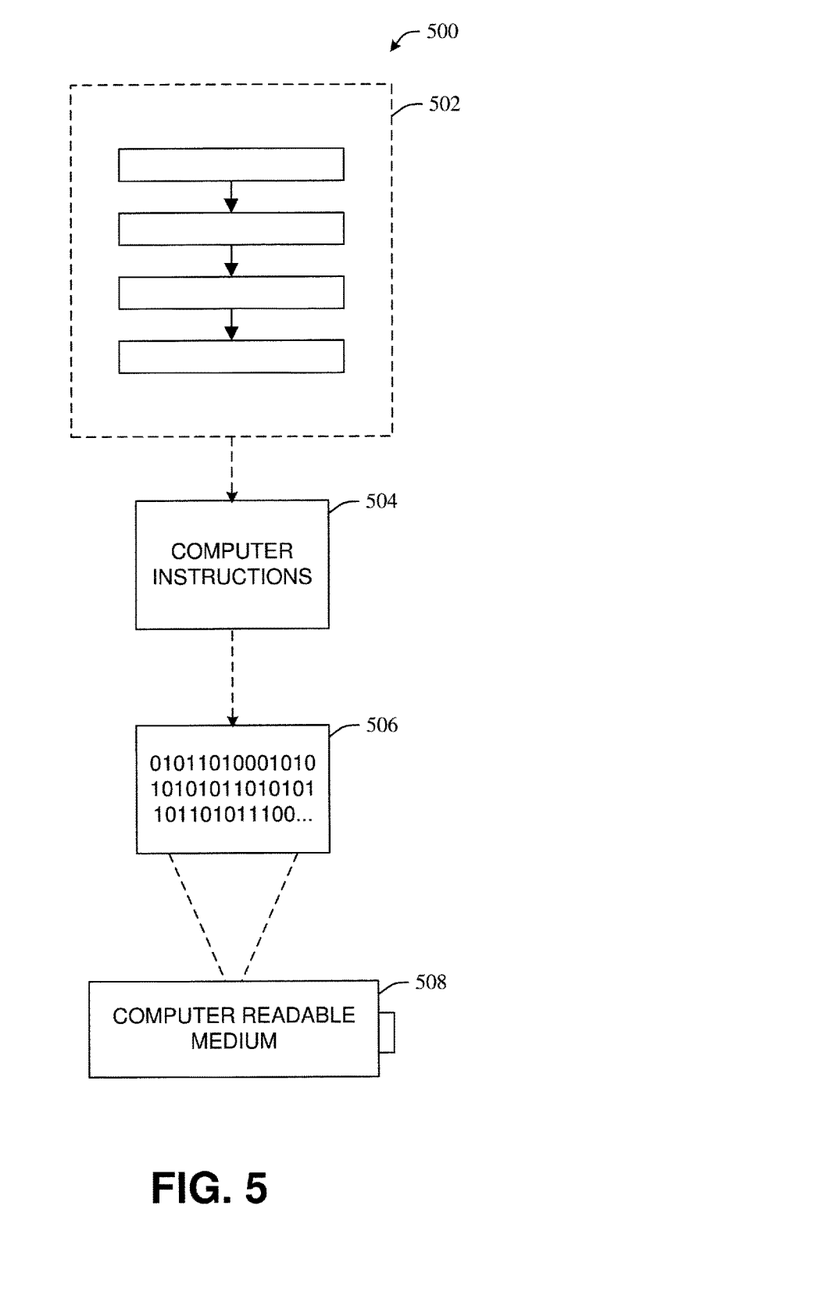
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
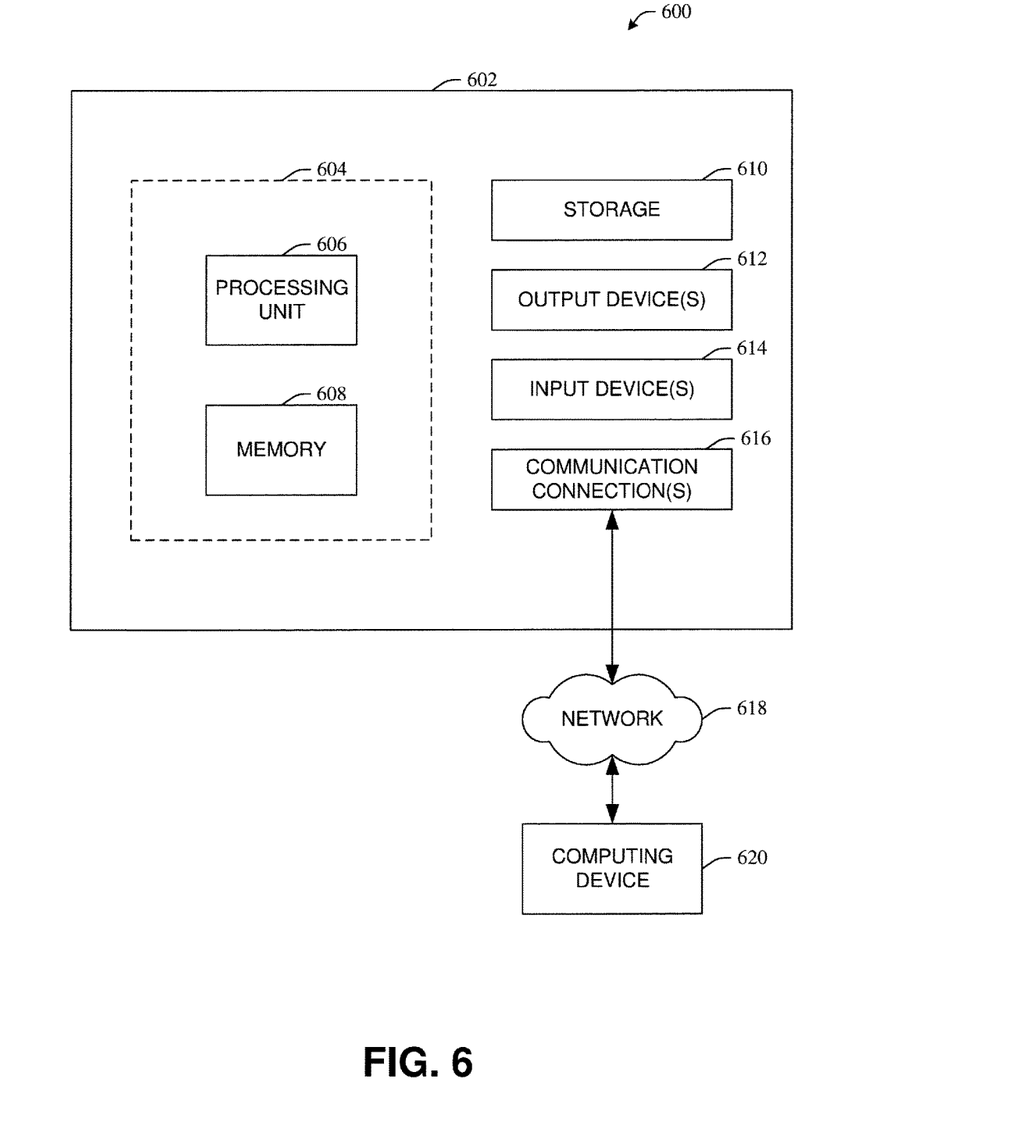
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for converting an application, comprising:
receiving application code from a source application, the application code written in a first programming framework;
dividing the application code into clusters;
evaluating clusters according to predetermined programming rules, wherein the evaluation comprises:
determining a conversion score for each cluster;
comparing the conversion score of each cluster to a predetermined threshold score; and
converting clusters having a conversion score above the predetermined threshold into a second programming framework, wherein the converting comprises:
extracting software features of each cluster having a score below the predetermined threshold;
passing the software features into a model; and outputting, by the model, clusters of code performing the software features in the second programming framework; and optimizing the predetermined rules according to machine learning techniques for future application conversions.

2. The method of claim 1, wherein dividing the application code comprises:

parsing the application code using k-mean clustering to create coarse logical clusters; and applying hierarchical divisive clustering to each coarse logical cluster to create fine grained micro clusters, the micro clusters are organized into type and nature of software features.

3. The method of claim 1, wherein the optimizing the predetermined rules comprises:

building a model that determines mapping based on the clusters in the first programming framework and corresponding clusters in the second programming framework.

4. The method of claim 1, wherein the model includes recognizing standardized features in the first programming framework and converting into standardized features in the second programming framework.

5. The method of claim 4, wherein the standardized features include code semantics, modularity, layering, strong cohesion, loose coupling, or design time class relationships including association, aggregation, dependency, generalization, or realization.

6. The method of claim 1, further comprising:

generating a conversion report including details about the conversion.

7. The method of claim 1, further comprising:

debugging the clusters in the second programming framework.

8. A system for converting applications, comprising:

a processor configured to execute:

a cluster component that divides application code into clusters, the application code is from a source application and written in a first programming framework;

a scoring component that evaluates clusters according to predetermined programming rules wherein the scoring component is configured to:

determine a conversion score for each cluster, and compare the conversion score of each cluster to a predetermined threshold score;

a conversion component that converts clusters having a conversion score above the predetermined threshold into a second programming framework, an extraction component configured to:

extract software features of each cluster having a score below the predetermined threshold, and pass the software features into a modeling component; and the modeling component that outputs clusters of code performing the software features in the second programming framework.

9. The system of claim 8, comprising:

a parsing component that divides the application code using k-mean clustering to create coarse logical clusters; and a hierarchy component that applies hierarchical divisive clustering to each coarse logical cluster to create fine grained micro clusters, the micro clusters are organized into type and nature of software features.

10. The system of claim 9, further comprising:

a reporting component that generates a conversion report including details about the conversion.

11. The system of claim 9, wherein the conversion component is further configured to:

debug the clusters in the second programming framework.

12. The system of claim 8, comprising:

a reporting component that optimizes the predetermined rules according to machine learning techniques for future application conversions.

13. The system of claim 8, wherein the model includes recognizing standardized features in the first programming framework and converting into standardized features in the second programming framework.

14. The system of claim 13, wherein the standardized features include code semantics, modularity, layering, strong cohesion, loose coupling, or design time class relationships including association, aggregation, dependency, generalization, or realization.

15. A non-transitory computer readable medium having instructions to control one or more processors configured to:

receive application code from a source application, the application code written in a first programming framework;

divide application code into clusters;

determine a conversion score for each cluster;

compare the conversion score of each cluster to a predetermined threshold score;

convert clusters having a conversion score above the predetermined threshold into the second programming framework, wherein convert comprises:

extract software features of each cluster having a score below the predetermined threshold;

pass the software features into a model; and convert, by the model, clusters of code performing the software features in the second programming framework.

\* \* \* \* \*